United States Patent [19]

Park

[11] Patent Number: 5,993,715
[45] Date of Patent: Nov. 30, 1999

[54] METHOD OF UNIDIRECTIONALLY ALIGNING WHISKERS DURING TAPE CASTING

[75] Inventor: Dong-Soo Park, Sangnam-Dong, Rep. of Korea

[73] Assignee: Korea Institute of Machinery & Materials, Chungcheongnam-do, Rep. of Korea

[21] Appl. No.: 08/868,838

[22] Filed: Jun. 9, 1997

[30] Foreign Application Priority Data

Jan. 8, 1997 [KR] Rep. of Korea .......................... 97-2371

[51] Int. Cl.⁶ .............................. B28B 1/14; C04B 35/81
[52] U.S. Cl. ................... 264/172.19; 264/640; 264/641; 264/650; 264/166; 264/212; 264/216
[58] Field of Search .................................. 264/640, 641, 264/650, 166, 172.19, 212, 216

[56] References Cited

U.S. PATENT DOCUMENTS 4,886,767 12/1989 Goto ....................................... 264/683
5,603,877 2/1997 Kato ....................................... 264/683

OTHER PUBLICATIONS

Becher, "Microstructural Design of Toughened Ceramics," 74 *J. Am. Ceram. Soc.* 225–69 (1991).
Hirao et al., "Microstructure Control of Silicon Nitride by Seeding with β–Silicon Nitride Particles," 77 *J. Am Ceram. Soc.* 1857–62 (1994).
Hirao et al., "Processing Strategy for Producing Highly Anisotropic Silicon Nitride," 78 *J. Am. Ceram. Soc.* 1687–90 (1995).
Muscat et al., "Microstructure of an Extruded β–Silicon Nitride Whisker–Silicon Nitride Composite," 75 *J. Am Ceram. Soc.* 2713–18 (1992).
Goto et al., "Mechanical Properties of Unidirectionally Oriented SiC–Whisker–Reinforced $Si_3N_4$ Fabricated by Extrusion and Hot–Pressing," 76 *J. Am Ceram. Soc.* 1420–24 (1993).
Geiger et al., "Flow Between Parallel Plates," *Transport Phenomena in Metallurgy* pp. 41–43 (1973).
Wittmer et al., "Development of $β–Si_3N_4$ For Self–Reinforced Composites," 13 *Ceram. Eng. & Sci. Proc.* 907–917 (1992).
Ohama, "Research and Development of Advanced Composite Materials for Gas Turbine Applications," 43 *Powder and Powder Metallurgy*, 407–414 (1996).
Mistler, "The principles of tape casting and tape casting applications," *Ceram. Processing* 147–163 (1995).
Evans et al., "Fracture Toughness Determinations by Indentation," 59 *J. Am. Ceram. Soc.* 371–372 (1976).
Wu et al., "Fabrication of Oriented SiC–Whisker–Reinforced Mullite Matrix Composites by Tape Casting," 77 *J. Am Ceram. Soc.* 2586–92 (1994).

*Primary Examiner*—James Derrington
*Attorney, Agent, or Firm*—Adduci, Mastriani & Schaumberg, L.L.P.

[57] ABSTRACT

A method of unidirectionally aligning the whiskers during tape casting and a sintered silicon nitride laminate of controlled properties and microstructure through alignment of the reinforcing grains fabricated by using the method are disclosed. The whiskers are unidirectionally oriented by placing a row of guides 0.2–0.5 mm apart from each other at exit of the reservoir of the slip containing the whiskers during tape casting. The silicon nitride comprising 10–30 volume % of elongated large grains growing from the $β-Si_3N_4$ whiskers and oriented unidirectionally in the fine grained matrix is fully densified by gas pressure sintering at 1900° C. It exhibits a fracture toughness value as high as 9.24 Mpa √m normal to the whisker alignment according to the Evans-Charles' method disclosed in the Journal of the American Ceramic Society, 59 [7–8], 371–372 (1976).

7 Claims, 5 Drawing Sheets

METHOD OF UNIDIRECTIONALLY ALIGNING WHISKERS DURING TAPE CASTING

BACKGROUND OF THE INVENTION

The present invention relates to a method of unidirectionally aligning whiskers during tape casting and a sintered silicon nitride ceramic laminate consisting of layers containing unidirectionally oriented silicon nitride whiskers fabricated by using the method.

Advanced ceramic materials have been attracting a lot of attention as candidate materials for certain parts of advanced machinery due to their excellent mechanical and/or chemical properties. Thanks to intensive R&D activities, there are many advanced ceramics parts serving in the advanced and more efficient machinery today.

However, there still remain barriers to more widespread use of the advanced ceramics, one of which is their brittleness. Many efforts have been made to make ceramic materials of higher fracture toughness. Whisker reinforced ceramic composites have been developed to improve the fracture toughness of the ceramic materials. Whiskers of high aspect ratio are effective for resisting the crack propagation as summarized by Becher in the Journal of the American Ceramic Society, 74, 255–69 (1991).

Since excellent properties along a specific direction was expected and observed from a composite materials containing aligned whiskers, many research workers have made efforts to control the orientation of the whiskers of the composite. Muscat et al. reported on the microstructure of sialon containing 15% of β silicon nitride whiskers which were aligned in the extrusion direction in the Journal of the American Ceramic Society, 75, 2713–18 (1992). Goto and Tsuge reported on the mechanical properties of unidirectionally oriented SiC whisker reinforced silicon nitride fabricated by extrusion and hot pressing in the Journal of the American Ceramic Society, 76, 1420–24 (1993). They noticed not only higher fracture toughness in the direction normal to the whiskers but also higher flexural strength for the specimen containing aligned whiskers. Wu and Messing reported on the fabrication of mullite matrix composite containing aligned SiC whiskers by tape casting method. They prepared the composite containing 30 volume % of SiC whiskers. They noticed that the whiskers became better aligned as the casting speed increased, but it should be very high for an appreciable alignment.

Silicon nitride ceramic materials are often called "self-reinforced ceramic materials" due to their microstructural development during sintering at high temperature. The equi-axial fine grains of the starting silicon nitride powder dissolve into the liquid and reprecipitate as needle-like grains, some of which grow large enough to act as reinforcements. The microstructural change is more noticeable if the starting powder is of α phase. Since Wittmer et al. reported on the development of β silicon nitride for self-reinforced composites by using the "seeding" method in Ceramic Engineering & Science Proceedings, 13, 907–917 (1992), many researchers have employed the method for controlling the microstructures of their silicon nitride specimens. Hirao et al. prepared their own seed crystals of β silicon nitride average aspect ratio of which was about 4.5 as they reported in the Journal of the American Ceramic Society, 77, 1857–1892 (1994). They also prepared the silicon nitride laminates containing the seed crystals and noticed that the large elongated grains in the sintered specimen were lying randomly in each layer as reported in the Journal of the American Ceramic Society, 78, 1687–90 (1995).

SUMMARY OF THE INVENTION

It is, therefore, an object of the present invention to provide a method of unidirectionally aligning the whiskers during tape casting and a silicon nitride ceramic material which exhibits excellent properties including fracture toughness, flexural strength and etc. in a specific direction or specific directions fabricated according to the method.

Silicon nitride laminates of the present invention exhibit markedly improved fracture toughness without losing the strength in a specific direction, and they are suitable for use as high-temperature members such as a gas turbine stator vane as suggested by Ohama in Powder and Powder Metallurgy, 43, 407–414 (1996). The laminates are capable of being manufactured by hot pressing, pressureless sintering, gas pressure sintering, or sinter-hipping as desired.

It has been found that when $\beta$-$Si_3N_4$ whiskers of high aspect ratio (>10) and proper thickness (0.5–1.5 micrometer) are employed in a certain proportions and are unidirectionally oriented, the densified silicon nitride laminates consisting of the layers containing those whiskers have excellent properties, including fracture toughness in a direction normal to the long axis of the aligned whiskers. Further, by using proper stacking sequence of the layers each of which contains the unidirectionally oriented $\beta$-$Si_3N_4$ whiskers, the properties of the laminate are properly controlled.

According to the present invention, there is provided a silicon nitride laminate comprising the aligned reinforcing grains grown from the $\beta$-$Si_3N_4$ whiskers and a matrix consisting essentially of the fine silicon nitride grains and the intergranular glassy phase. The weight percent of the $\beta$-$Si_3N_4$ whiskers added at the beginning is preferably in the range between 0.5 and 5, and the reinforcing grains grown from them cover about 10–30 volume % of the laminate after sintering. If the content of the $\beta$-$Si_3N_4$ whiskers added at the beginning is too high, each of them do not have enough space to grow large before it hits the others and stops growing. If the content is too low, there are too few reinforcing grains to impart high toughness to the composite. The sintering additives of the silicon nitride laminate are any metal oxide(s) or metal nitride(s) or mixtures thereof that help achieve full densification of the ceramic.

The silicon nitride compositions of the present invention are composed predominantly of silicon nitride in the β or high temperature crystalline form. Preferably, more than 95% of the starting raw material $Si_3N_4$ powder should be in the α crystalline form or in the noncrystalline, amorphous form or mixtures thereof. The particle size of the $Si_3N_4$ powder is also an important consideration. Since the $\beta$-$Si_3N_4$ whiskers added for this invention work as preferential sites for grain growth ("seeds") which occurs preferentially in the long axis direction of the whisker (c-axis of its crystal structure), the particle size of the $Si_3N_4$ powder should be smaller than the width of the whisker. The particle size of the powder is preferred to be less than 5 micrometer and $d_{50}$ to be as small as 1 micrometer, more preferably less than 3.5 micrometer and $d_{50}$ to be smaller than 0.5 micrometer. Very small portion of the $Si_3N_4$ powder is known to be in the β crystalline form and it can also act as the preferential site for the grain growth if it survives dissolution into the liquid at high temperature. Since the orientation of these β crystalline particles is not controlled, that of the large grains grown from them should be random. Once the phase transformation of the α- to $\beta$-$Si_3N_4$ is complete, the grain growth occurs by dissolution of smaller grains and precipitation to larger grains. So, if the size of the $\beta$-$Si_3N_4$ whiskers is larger than that of the $\beta$-$Si_3N_4$ crystals present in the starting $Si_3N_4$ powder, the reinforcing grains are aligned by aligning the whiskers. However, if it happens in the other way, then the reinforcing grains grown from the β-Si$_3$N$_4$ crystals would be randomly oriented. The purity of the Si$_3$N$_4$ powder is also an important consideration since the impurities tend to concentrate into the intergranular phase and deteriorate the high temperature property of the sintered silicon nitride.

A process for preparing the silicon nitride ceramic laminate of the present invention adopts the tape casting, lamination and gas pressure sintering. Preparation of a slip for tape casting is widely reported in the literature one of which is written by Mistler in Ceramic Processing edited by Terpstra, Pex and de Vries published by Chapman & Hall, London, UK, pg. 147–173 (1995).

There are several reports on aligning the whiskers in the whisker reinforced ceramic composites as mentioned in the previous section. However, the extrusion method which was most widely used for the alignment is not suitable for a sheet or a large product, not to mention for a complicated shape. Some researchers simply employed a tape casting method for the alignment and claimed that the flow during tape casting tended to orient the whiskers (or seed particles). However, the dimensions of the whiskers are in the order of a hundred micrometers, which is smaller than $\frac{1}{1000}$ of the width of the flow during tape casting. The velocity gradient near the edge of the flow might be large enough to orient the whisker in the flow in the casting direction. But, it is very hard to expect that the small velocity gradient along a whisker in the central region which covers most of the flow can orient the whisker. If the tape casting speed or the whisker content in the flow is low, it becomes extremely difficult to orient the whiskers unidirectionally by a simple tape casting technique. One can imagine a few timber logs of 1 meter long flowing down a river of 1 km width, or a few wood sticks of 10 centimeters long flowing down a river of 100 meter width. However, the situation is totally changed if there are many piers of a bridge in the river. The flow pattern is broken into many small laminar flows, each of which having an extremely large velocity gradient near the piers. FIG. 1 shows the flow patterns of the two situations. This can orient the timber log, the wood stick or the whisker in the flow direction because of the large velocity gradient.

The basic idea of the present invention is based on the piers of the bridge in the river. Many sharp guides, such as pins or blades, which would function as piers of the bridge in the river, are lined up at the exit of the dam for the slip of the tape casting equipment. The space between the guides normal to the casting direction is preferably less than 5 millimeters, more preferably less than 0.5 millimeter and greater than 0.2 millimeter. If the space is too large, the velocity gradient in the flow is not big enough for orienting the whiskers. If the space is too small, some of whiskers are caught between the guides and the slip cannot flow smoothly. FIG. 1 shows the two cases where the slip is tape cast with and without the guides. The laminar flow and unit thickness is assumed for the slip during tape casting. So, velocity distribution in the flow without the guides is expressed as $V_x = -C[y^2-(\frac{1}{2})^2]$, where $V_x$ is the velocity in the x axis direction, C is shape constant, y is the position on y axis ($-\frac{1}{2}<y<\frac{1}{2}$), and 1 is the width of the tape. The velocity distribution in each small flow between the two guides is expressed $V_x = -C'[y^2-(\frac{1}{2}n)^2]$, where $V_x$ is the velocity in the x axis direction, C' is shape constant, y is position on the y axis ($-\frac{1}{2}n<y<\frac{1}{2}n$), and n is the number of the guides evenly dividing the width of the tape.

Since the thickness of the tape is assumed to be unity for the both cases, flux (J) can be expressed as $J=\int V_x dy = C \int_{1/2}^{1/2} V_x dy$ and $J' = \int V_x dy = C'\int_{1/2} n^{1/2} nV'_x dy$, respectively. The same amount of slip flows with or without the guides during tape casting. So, $J=nJ'$ and $C'$ is $n^2C$. Torque (M) on the whisker is expressed by $M=\Delta\tau_{xy}X\delta 1$, where $\Delta\tau_{xy}$ is the shear stress difference at the two end points of the whisker and δ1 is the projection length of it on the y axis of it. $\tau_{xy}=-\eta(dV_x/dy)$ and $M=C \ 2\eta(\delta 1)^2$. In the same way, $M'=n^2 C\eta(\delta 1)^2$. Therefore, torque felt by the whisker in the tape cast by using the guides is n square times that by using no guide. If the guides are placed 0.3 mm apart from each other on y axis in 150 mm wide tape, 500 guides are lined up normal to the tape casting direction at the exit of the dam. Torque experienced by the whisker passing between the two guides is 250,000 times that of the one passing the wide exit with no guide.

It is important not to disturb the whisker alignment during further handling of the tape; stretching or deforming the tape could change the distribution and orientation of the whiskers in the tape. Clearance of gates of the dam for the slip is also important for the alignment of the whiskers in thickness direction of the tape for the same reason as described for the space between the guides at the exit of the dam. Lamination of the sheets (tapes cut into an appropriate size) is performed preferably at the temperature between 60° C. and 110° C., more preferably between 80° C. and 90° C., under a pressure between 10 Mpa and 150 Mpa, more preferably between 30 Mpa and 60 Mpa, by a lever press. If the lamination temperature or the pressure is too high, the whisker alignment is disturbed during pressing. If it is too low, large bubbles are trapped in between the layers. After laminating the sheets, a binder burn-out process is performed which removes the organic ingredients for preparing the tape. After binder burn-out, the green body is sintered by pressureless sintering, hot pressing, gas pressure sintering or sinter-hipping, preferably by gas pressure sintering because of the high temperature at which silicon nitride can be sintered and more rapid grain growth occurred. The sintering temperature is preferably above 1800° C., more preferably above 1850° C., and below 2050° C. If the sintering temperature is too low, full density is hard to obtain and the grain growth is too limited for the toughening effect. If the sintering temperature is too high (higher than 2050° C.), it becomes very hard to suppress the decomposition of the silicon nitride below an acceptable limit.

BRIEF DESCRIPTION OF THE FIGURES

FIG. 3 is a SEM micrograph of the fracture surface of the sintered laminate prepared by the method described in Example 2; it contains the two cross-ply layers of aligned whiskers and the layer with no whisker in between.

DETAILED DESCRIPTION OF THE PREFERRED EMBODIMENT

Figure 1:
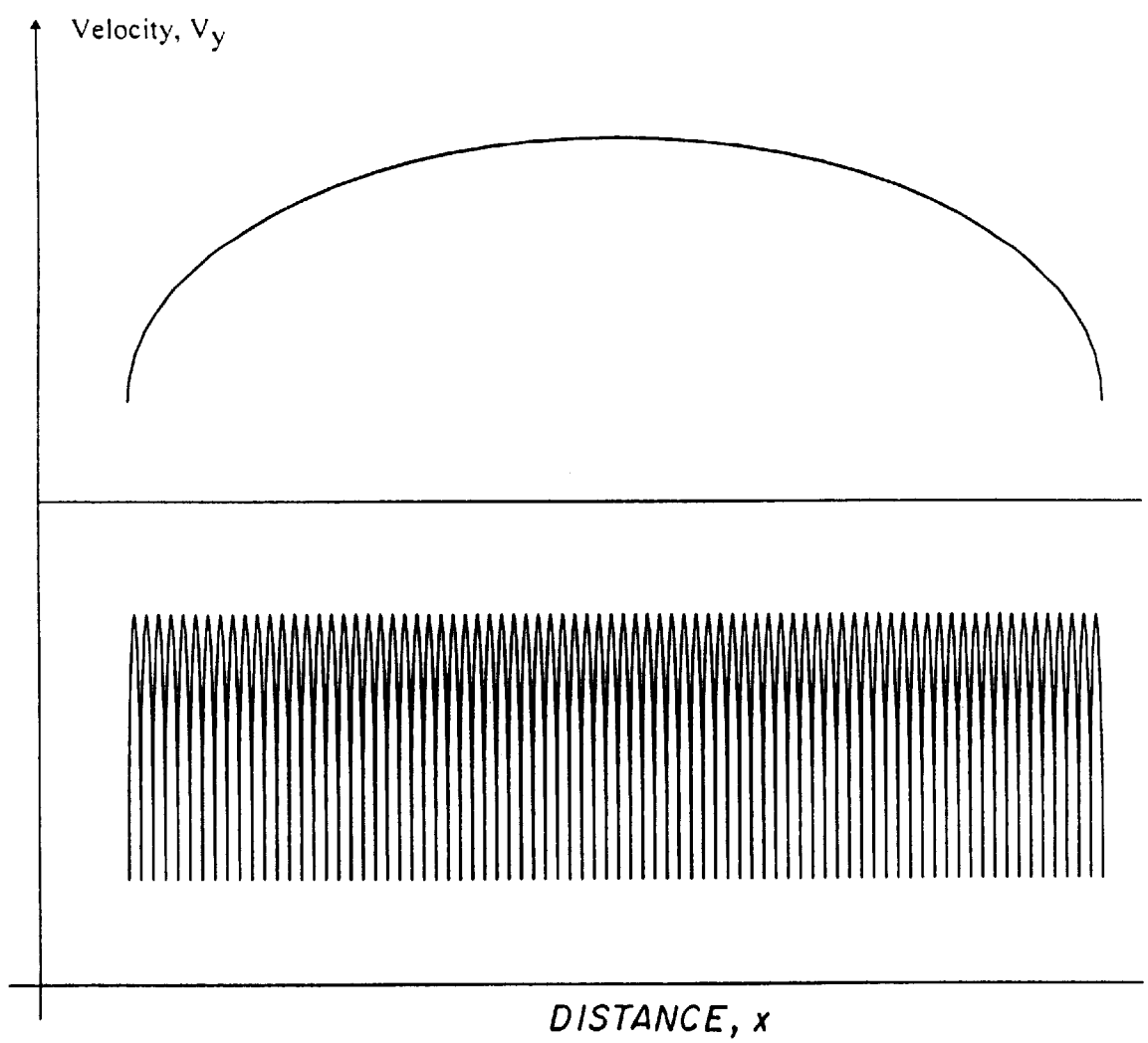
FIG. 1 is a schematic diagram illustrating the two laminar flow patterns described in the text.
Figure 2:
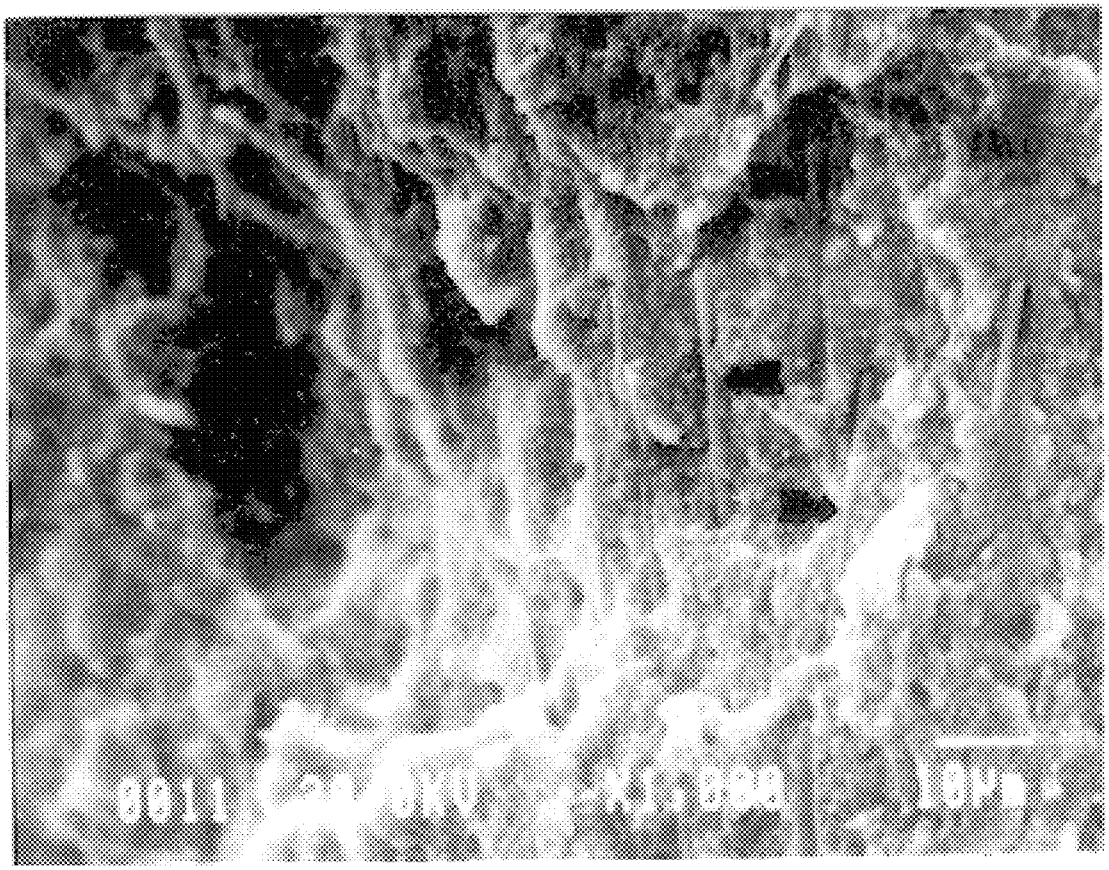
FIG. 2 is a SEM micrograph showing cross section of the tape prepared by the method described in Example 1 where the whiskers aligned in the tape after the casting.
Figure 3:
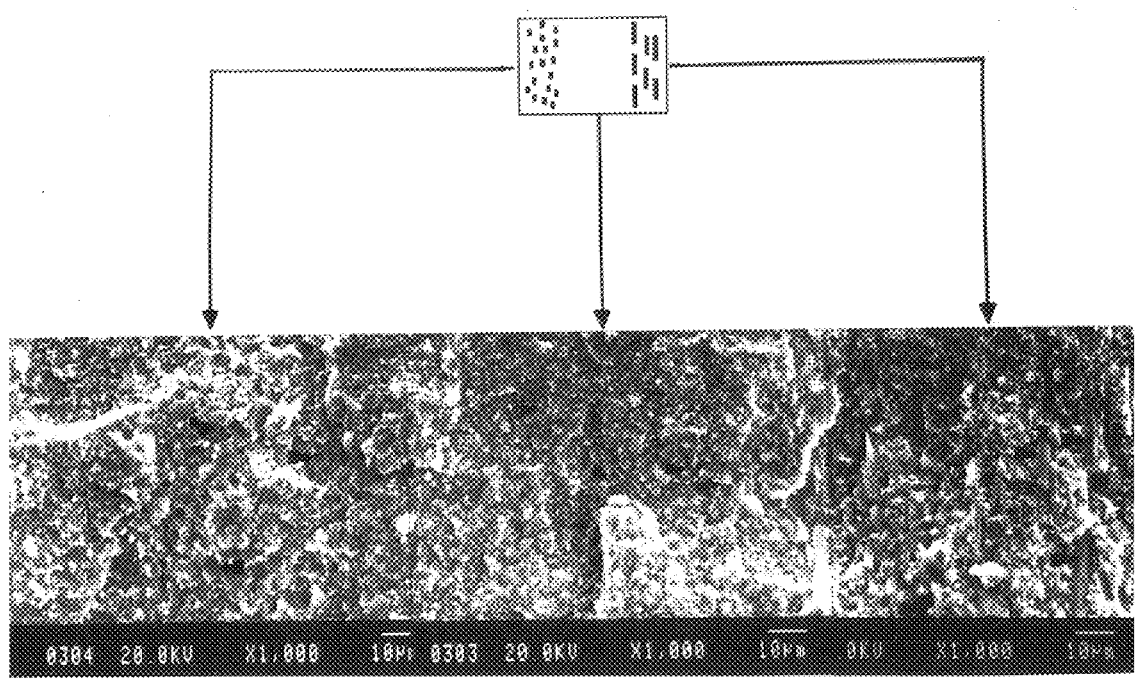
Figure 4:
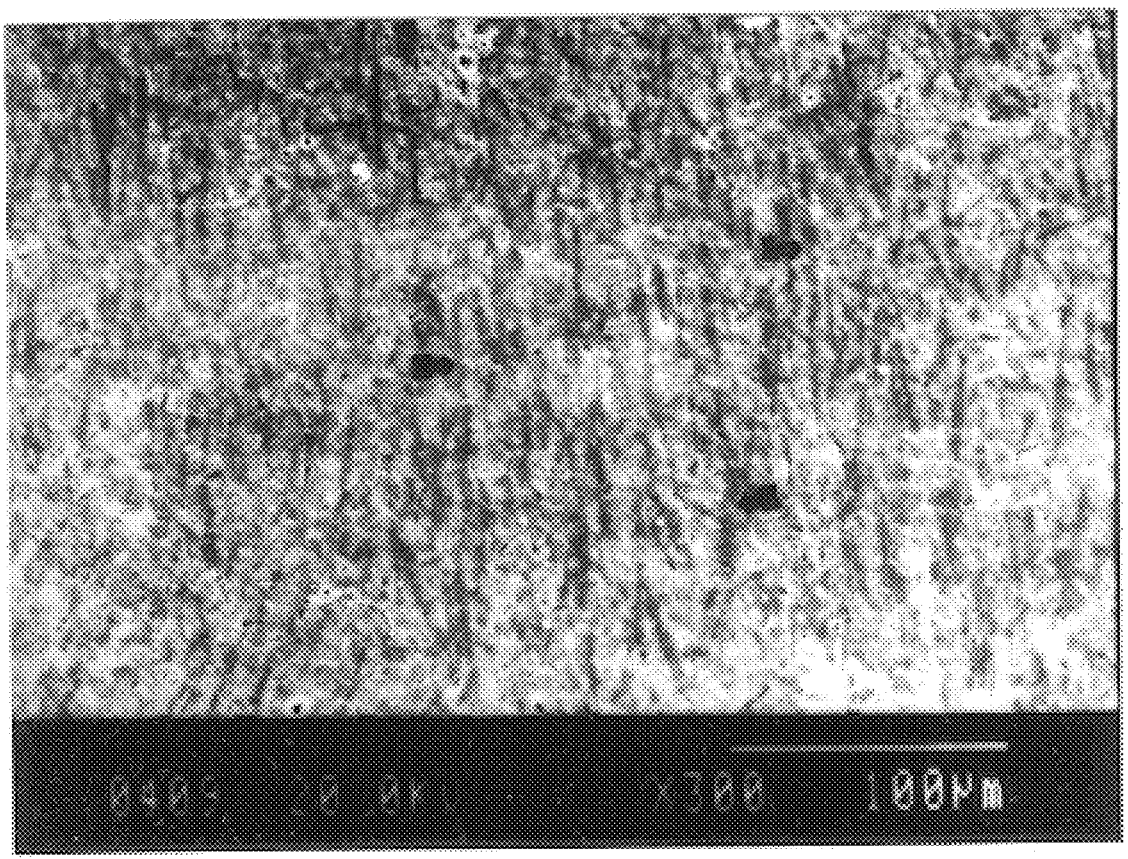
FIG. 4 is a SEM micrograph of the top surface of the specimen shown in FIG. 3 after being etched by a molten salt mixture of NaOH and KOH.

The following Examples are provided to illustrate the silicon nitride laminate and the method of making it. These Examples do not limit the scope of this invention.

EXAMPLE 1

The slip for tape casting in the present invention is prepared by mixing 72.2 g of $Si_3N_4$ powder (SN-E10, Ube Industry Co., Tokyo, Japan) having a specific surface area (S.S.A.) of 10.7 $m^2/g$ and an average particle size of 0.43 micrometer ($d_{50}$ on centrifugal sedimentation method), 5 g of $Y_2O_3$ powder (Fine, H. C. Starck Co. & GmbH, Berlin, FRG) having a S.S.A. of 16.5 $m^2/g$ and an average particle size (F.S.S.S.) of 0.29 micrometer, and 1.6 g of $Al_2O_3$ powder (AKP-30, Sumitomo Chem. Co., Osaka, Japan) having a S.S.A. of 6.7 $m^2/g$ and an average particle size (F.S.S.S.) of 0.37 micrometer by using 300 g of silicon nitride balls (SUN11, Nikkato Co., Tokyo, Japan), the diameter of which is 5 millimeter, and 130 cc of the liquid medium (methyl isobutyl ketone). 2 g of Hypermer KD1 (ICI Chemical Co., Madrid, Spain) is added for dispersion. The aforementioned ingredients are put into a plastic jar and mixed by planetary ball milling for 4 hours at 150 rpm. After that, 23 g of poly(vinylbutyral-co-vinyl alcohol-co-vinylacetate) as a binder and 17.5 g of dibutyl phthalate as a plasticizer are added to the jar and milling is continued for 3.75 more hours. After that, 4.15 g of $Si_3N_4$ whisker (SNWB, Ube Industries Co., Tokyo, Japan) is added into the mixing jar and milling is continued for another 0.25 hour. The mixed slip is vacuum treated for de-airing and subsequently is poured into the dam of a tape casting equipment ("doctor blade"). The clearance of the gates of the dam is 0.45 mm. The pins line up and are located at the exit of the dam. The space between two neighboring pins on a projection plane normal to the casting direction is 0.35 millimeter. Tape containing aligned whiskers is dried overnight in open air at room temperature and cut into a desired shape. The tape cuts (sheets) are stacked in such a sequence that the whiskers are parallel to each other and pressed by using a lever press under 30 Mpa pressure and heated to 80° C. for 30 minutes. It is cooled down by turning off the power to the heater and the pressure is removed at room temperature. The laminate is subsequently subjected to a binder burn-out process for which it is packed with fine silicon nitride powder under a dead weight and heated at 1.5° C./hour in open air to 600° C., where it is held for 10 hours and furnace cooled. The laminate is subjected to cold isostatic pressing (CIP) under 250 Mpa for 3 minutes after the latex tubing in vacuum. The green body is heated in a gas pressure sintering furnace at 1900° C. under 2 Mpa pressure of nitrogen for 3 hours. Properties of the sintered laminate are shown in Table 1.

EXAMPLE 2

A silicon nitride tape containing the whiskers is prepared in the same way as described in Example 1. Also, a silicon nitride tape without whisker is prepared in a similar way to that described in Example 1 except mixing 77.2 g of the $Si_3N_4$ powder, 5 g of the $Y_2O_3$ powder and 1.6 g of the $Al_2O_3$ powder only. A cross-ply laminate is prepared by stacking in a sequence of the sheet containing whiskers—that without whisker—90° rotation of the first sheet—that without whisker—the first sheet. Further process for obtaining a cross-ply laminate is the same as described in Example 1. So, this laminate contains only 2.5 wt % of the whisker. Properties of the sintered laminate are shown in Table 1.

Comparative Experiment 1

Figure 5:
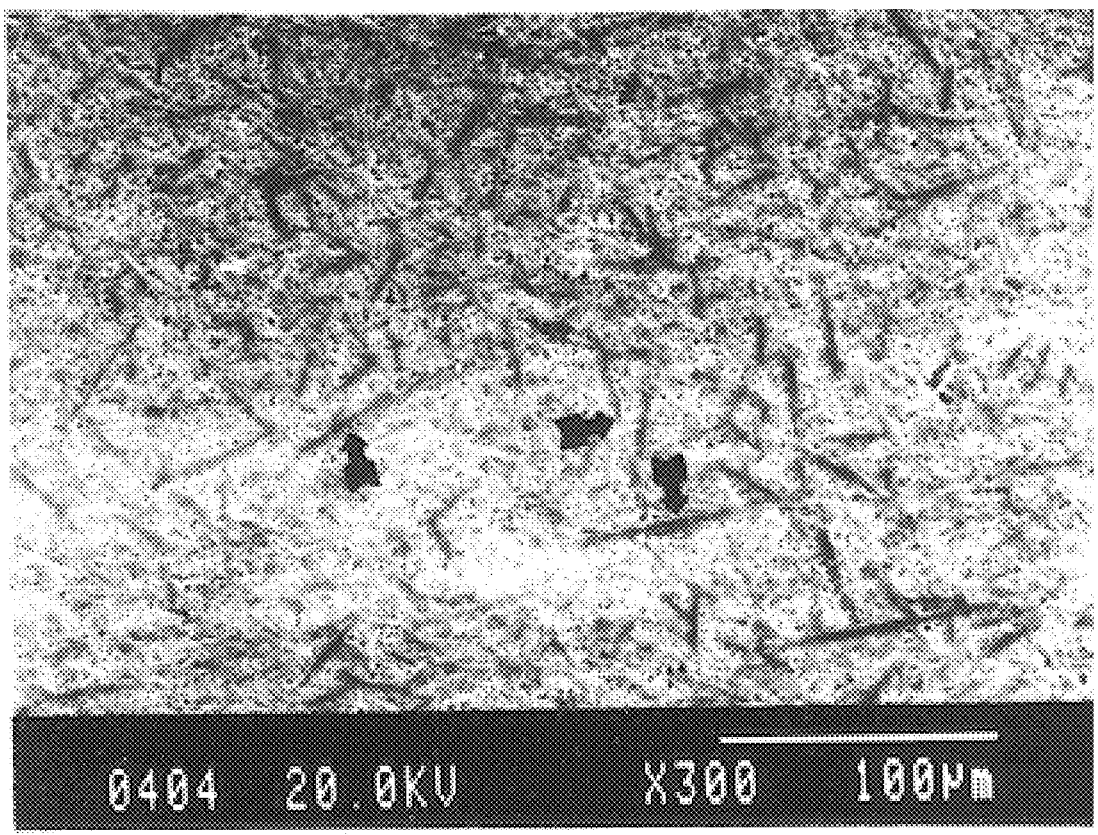
FIG. 5 is a SEM micrograph of the top surface of the specimen prepared by the method described in Example 3 after being etched by a molten salt mixture of NaOH and KOH.

A silicon nitride slip containing whiskers is prepared as described in Example 1 and tapecasting is performed without the pins at the exit of the dam. After lamination, binder burn-out and CIP procedure, a sintered laminate is prepared as described in Example 1. Properties of the sintered laminate are shown in Table 1 and its microstructure is shown in FIG. 5.

Comparative Experiment 2

A powder mixture of the same composition as that of Example 1 is prepared by simple planetary ball milling by using 500 cc of ethanol and the silicon nitride balls for 8 hours of which the whisker is mixed for the last 15 minutes. No dispersant, organic binder or plasticizer is used for preparing the powder mixture. Ethanol is evaporated on the hot plate while being stirred by a magnetic spinner and it is further dried in an oven after the spinner cannot move due to the high viscosity of the slurry. The powder mixture is pressed by a lever press in a steel mold under 10 Mpa pressure and it is further pressed by CIP under 250 Mpa after applying the latex tubing in vacuum. The green body is sintered according to the same heating schedule as described in Example 1. Properties of the sintered specimen are shown in Table 1.

TABLE 1

| Property | | | Example 1 | Example 2 | Comparative Experiment 1 | Comparative Experiment 2 |
| --- | --- | --- | --- | --- | --- | --- |
| Relative Density* (%) | | | 98.5 | 98.1 | 98.8 | 92.9 |
| Vickershardness** | Top Surface | | 14.28 | 13.83 | 13.91 | 10.75 |
| (Gpa) | Lamination Face | | 13.63 | 13.66 | 13.58 | |
| Fracture | Top Surface | Normal* | 7.1 | 6.74 | 6.51 | 5.88 |
| Toughness*** | | Parallel* | 5.64 | 6.55 | 5.78 | |
| (Mpa √m) | Lamination Face | Normal* | 9.24 | 6.97 | 7.71 | |
| | | Parallel* | 5.74 | 5.88 | 4.43 | |
| 3 point flexural strength**** (Mpa) | | | 887 | 1043 | 984 | 721 |

*Relative density = measured density/theoretical density calculated from the rule of mixture of the starting ceramic powders.
**Vickershardness is obtained by applying 9.8N load for 15 seconds.
***Fracture toughness is obtained by indentation crack length method according to Evans-Charles' technique by using 196N load for 15 seconds.
****3 point flexural strength is obtained by using 20 mm span and cross-head speed of 0.5 mm/min.
*Normal or Parallel means normal or parallel to the tape casting direction which assumes parallel to long axis of the aligned whiskers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

I claim:

1. A method of aligning whiskers unidirectionally during tape casting of a ceramic slip composition, comprising creating a plurality of high velocity gradients across the exit of a reservoir of a tape casting machine which are effective to align said whiskers such that at least 50% are lying within a ±30° angle about an axis, wherein said plurality of high velocity gradients is created by providing a plurality of guides at said exit, with the guides being lined up in spaced, coplanar relationship, with the spacing between guides being greater than twice the length of the longest whisker and less than 50 times the length of the longest whisker.

2. The method of claim 1, wherein said guides comprise either pins or blades.

3. The method of claim 1, wherein said whiskers comprise $\beta$-$Si_3N_4$ whiskers.

4. The method of claim 1, wherein said whiskers are present in said composition in an amount of 1 to 5 weight percent, based on the total weight of the composition.

5. The method of claim 1, wherein said composition comprises silicon nitride powder having a particle size of less than 5 micrometers.

6. The method of claim 1, wherein said spacing between guides is less than 5 millimeters.

7. The method of claim 6, wherein said spacing between guides is in a range of from less than 0.5 to greater than 0.2 millimeter.

* * * * *